United States Patent [19]

O'Dell et al.

[11] Patent Number: 6,068,891

[45] Date of Patent: May 30, 2000

[54] METHOD FOR LASER TEXTURING A GLASS CERAMIC SUBSTRATE AND THE RESULTING SUBSTRATE

[75] Inventors: Thomas A. O'Dell, Campbell; David Treves, Palo Alto; Tu Chen, Monte Sereno, all of Calif.

[73] Assignee: Komag, Inc., San Jose, Calif.

[21] Appl. No.: 08/911,817

[22] Filed: Aug. 15, 1997

[51] Int. Cl.$^7$ .................................................. G11B 5/82
[52] U.S. Cl. .................. 427/555; 427/554; 427/596; 360/135; 428/141; 428/65.3; 428/694 SG
[58] Field of Search .................... 428/141, 65.3, 428/694 ST, 694 SG, 900; 427/128, 129, 131, 555, 554, 596; 360/135

[56] References Cited

U.S. PATENT DOCUMENTS

| | | | |
|---|---|---|---|
| 4,996,622 | 2/1991 | Takatsuki et al. | 360/135 |
| 5,079,637 | 1/1992 | Aronoff et al. | 360/187 |
| 5,108,781 | 4/1992 | Ranjan et al. | 427/53.1 |
| 5,391,522 | 2/1995 | Goto et al. | 501/4 |
| 5,567,484 | 10/1996 | Baumgart et al. | 427/555 |
| 5,582,878 | 12/1996 | Ogawa et al. | 427/554 |
| 5,595,791 | 1/1997 | Baumgart et al. | 427/554 |
| 5,673,156 | 9/1997 | Chen et al. | 360/97.01 |
| 5,714,207 | 2/1998 | Kuo | 427/555 |
| 5,783,797 | 7/1998 | Xuan et al. | 219/121.69 |
| 5,853,820 | 12/1998 | Kuo et al. | 427/555 |

OTHER PUBLICATIONS

T. Yamamoto, et al., "Stiction Free Slider for Lightly Textured Disks", IEEE Trans. Magn. vol. 34, No. 4, 1998.

M. Wahl, et al., "Numerical Simulation of the Steady State Flying Characteristics of a 50% Slider with Surface Texture", IEEE Trans. Magn. vol. 30, No. 6, 1994.

Wachenschwanz, et al., "The Special Needs of Server–Class Disks", INSIGHT, vol. XI, No. 1, pp. 1, 11, 13 (Jan./Feb. 1998).

Fujitsu's Padded Slider Holds Stiction at Bay, DATA STORAGE, p. 8 (May 1998).

Lee et al., "Effect of Disk Cross Hatch Texture on Tribological Performance", IEEE Trans. Mag. vol. 28, No. 5, pp. 2880–2882 (Sep. 1992).

Marchon, et al., "Significance of Surface Roughness Measurements. Application to the Tribology of the Head/Disc Inerface", Tribology and Mechanics of Magnetic Storage Systems, VI ASLE SP–26, PP. 71–80 (1990).

Wei, et al., "Head–Disc Dynamics of Low Resonance Laser Textures—A Spectrogram Analysis", IEEE Trans. Mag. vol. 34, No. 4, pp. 1699–1701 (Jul. 19998).

T. Bennett et al., "Mecahnism of Topography Formation During CO2 Laser Texturing of Silicate Glasses", J. Appl. Phys., vol. 84, No. 5, pp. 2897–2905, Sep. 1, 1998.

M. Doerner et al., "Materials Issues in Magnetic Disk Performance", MRS Bulletin, pp. 28–34, Sep. 1996.

Jastrzebski, Z.D. "The Nature and Properties of Engineering Materials", published by John Wiley, 1976 pp. 368–370.

Teng, et al., "Laser Zone Texture On Alternative Substrate Disks", 1996, IEEE HA–02 (1 page).

Teng, et al., "Laser Zone Texture On Alternative Substrate Disks", IEEE Transactions on Magnetics, vol. 32, No. 5, Sep. 1996.

Kuo, et al., "Laser Zone Texturing On Glass–Ceramic Substrates" IEEE Transactions On Magnetics, vol. 33, No. 1, 6 pages (Jan. 1997).

Primary Examiner—Stevan A. Resan
Attorney, Agent, or Firm—Kenneth E. Leeds

[57] ABSTRACT

A method for texturing a glass ceramic substrate comprising the steps of applying a laser pulse to the substrate such that a portion of said substrate is heated to a temperature higher than the glass transition temperature of the glass phase of said substrate but lower than the melting point of the crystal phase of said substrate.

13 Claims, 5 Drawing Sheets

METHOD FOR LASER TEXTURING A GLASS CERAMIC SUBSTRATE AND THE RESULTING SUBSTRATE

BACKGROUND OF THE INVENTION

This invention relates to a method for laser texturing a substrate.

A typical process for manufacturing a magnetic disk comprises the following steps:
1. An Al alloy substrate is plated with an 8 μm thick NiP layer.
2. The NiP is laser textured, e.g., as discussed in U.S. Pat. No. 5,062,021 and 5,108,781, issued to Ranjan et al., incorporated by reference.
3. An underlayer, magnetic layer and protective overcoat are sputtered onto the textured NiP layer. (The underlayer is typically Cr, the Magnetic layer is typically a Co alloy and the protective overcoat is typically a hydrogenated carbon overcoat.)

The laser texturing step is performed because a texture on a magnetic disk has the beneficial effect of reducing stiction and friction between a read-write head and the disk during CSS ("contact start stop") operation.

It is also known in the art to use substrate materials other than Al. For example, it is known to use glass and glass ceramic. U.S. patent application Ser. No, 08/657,222, filed by C. Ross, discusses using glass substrates. Teng et al., "Laser Zone Texture on Alternative Substrate Disks", IEEE Trans. on Magnetics, Vol. 32, No. 5 (September 1996), pp. 3759–3761 discusses glass ceramic substrates. Teng and Ross are incorporated herein by reference. The advantage of glass or glass ceramic substrates is that they are extremely hard, and unlikely to sustain damage caused by impact with a read-write head.

The above-mentioned Teng paper discusses laser texturing glass ceramic substrates with a $CO_2$ laser. Teng's FIG. 5b shows that he was able to produce a smooth bump about 30 nm high and about 15 to 20 μm wide with a $CO_2$ laser.

As flying heights decrease, and read-write heads become smaller, it will be desirable to be able to form extremely small texture features on a magnetic disk. In the past, there has been a limit to the size of the texture features one can form with a laser only process.

SUMMARY

A method for manufacturing a magnetic disk comprises the step of laser texturing a glass ceramic substrate. Glass ceramic material is a composite of glass (e.g., silica glass) and crystalline material. We have discovered that by laser texturing glass ceramic, we can achieve texture features formed on a texture bump having extremely small, jagged features. These jagged features have a width on the order of one micron or less, and have heights as high as 10 nm or higher. Such a texture is extremely useful for reducing stiction and friction on a magnetic disk.

DETAILED DESCRIPTION

Figure 1:
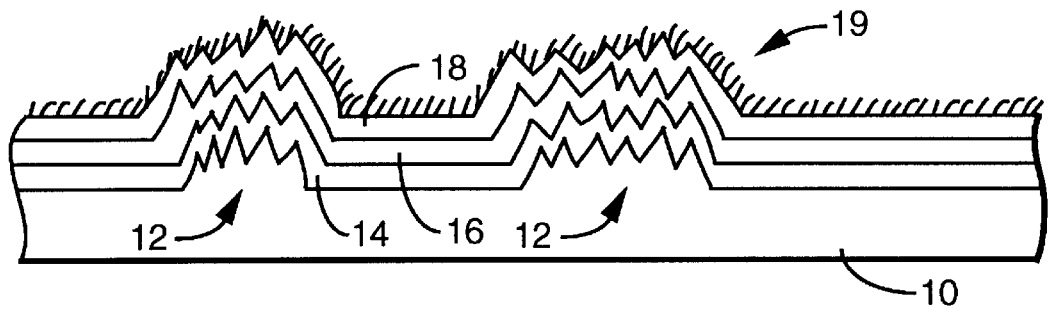
FIG. 1 illustrates in cross section magnetic disk manufactured in accordance with our invention.

A process for manufacturing a magnetic disk begins with the step of laser texturing a smooth, disk-shaped glass ceramic substrate 10 (FIG. 1). In one embodiment, substrate 10 has a diameter of 84 mm and a thickness of 0.651 mm, but other dimensions may also be used.

As mentioned above, glass ceramic is a material comprising an amorphous glass phase and a crystalline phase. The amorphous phase is typically silica. In one embodiment, the crystalline phase comprises lithium disilicate. Such glass ceramic material can be purchased from Ohara Ltd. of Japan. For example, substrate 10 can be glass No. TS10-4 C-SP or TS10-BU available from Ohara. Substrate 10 can also be a glass ceramic sold under the trade name MOD-AL by Raychem Corporation.

Other types of glass ceramic can also be used. Glass ceramic materials are discussed by G. H. Beall in "Design and Properties of Glass-Ceramics", Review Material Science, pg. 91–119, Vol. 22, 1992, incorporated by reference. Other glass ceramic materials are discussed by Jastrzebski, "The Nature and Properties of Engineering Materials", 2d. edition, published by John Wiley & Sons, 1976, p. 368 et seq., incorporated by reference. Also see U.S. Pat. No. 4,386,162 and European Patent Application 0 384 574 A2, incorporated herein by reference.

The glass ceramic material can be laser textured with a $CO_2$ laser having a wavelength of 10.6 μm (or other appropriate wavelength), a focused spot size between 5 μm and 30 μm and a pulse width between 0.1 μs and 40 μs. This results in the formation of laser bumps 12. Bumps 12 serve to reduce friction and stiction between the disk (when it is completed) and a read-write head during use.

In one embodiment, the spot size is 20 μm, the pulse width is 1 μs and the glass ceramic substrate is TS10-4 C-SP.

Of importance, we precisely control the laser pulse-width, energy, and density to achieve a unique and novel laser texture, having extremely small jagged features superimposed on a larger positive protrusion. In one embodiment, the larger protrusions have widths from 1 to 30 microns, and heights from 1 to 50 nm. The small jagged features have widths less than those of the larger protrusions (e.g. from 0.05 to 1 microns wide) and heights from 0.5 to 40 nm. Preferably, the small jagged features have heights greater than 1 nm, and typically greater than 2 nm. Further details concerning these texture bumps are discussed below.

After the glass-ceramic disk has been laser textured, the magnetic disk is completed by sputtering an underlayer 14 (e.g., Cr or NiP), a magnetic Co alloy 16, and a hydrogenated carbon overcoat 18 onto the disk. These layers can be deposited as taught in U.S. patent application Ser. No. 08/286,653, filed by Chen et al., incorporated herein by reference. These layers can also be deposited as taught in U.S. Pat. No. 5,180,640, issued to Yamashita, incorporated herein by reference.

After layers 14, 16 and 18 are deposited, a lubricant layer 19 is applied to the magnetic disk.

FIGS. 2a to 2d are atomic force microscope ("AFM") profiles of laser texture bumps formed in a glass ceramic substrate. The substrate was glass type TS10-4 C-SP glass ceramic material, available from Ohara, Ltd.

A $CO_2$ laser with a wavelength of L0.6 μm and a focused spot size of 24 μm was used to produce the laser texture bumps of FIGS. 2a to 2d. Table I below indicates the important parameters used to laser texture the glass ceramic material of FIGS. 2a to 2d:

TABLE I

| Fig. | Pulse Duration | Energy per pulse |
|------|----------------|------------------|
| 2a   | 5 μs           | 7.12 μJ          |
| 2b   | 5 μs           | 6.65 μJ          |
| 2c   | 1 μs           | 6.73 μJ          |
| 2d   | 1 μs           | 6.0 μJ           |

The texture features in FIGS. 2a to 2d include bumps having heights between 15 and 30 nm. The bumps have diameters from 8 to 15 μm. However, within these bumps are smaller "microbumps" having widths of 1 μm or less, and "peak to valley" distances as high as 10 nm. These microbumps are surprising and unexpected. An important trend is apparent in FIGS. 2a to 2d which is that as the pulse length becomes longer the texture features become smoother.

While others have laser textured glass ceramic substrates, we believe the results we have achieved are unique. For example, the profiles in the Teng article look nothing like the profiles we achieved. (Compare the Teng profiles with FIG. 2.) We believe this is because Teng used parameters that caused the glass ceramic material to be heated above the crystal phase material melting point. We further believe that by heating the glass ceramic material above the glass transition temperature of the amorphous phase, but below the crystal phase melting temperature, we achieve our unique surface texture.

The microbumps of the present invention are important. By reducing the smoothness of the texture features the "area of contact" between the read-write head and the disk is reduced, thereby minimizing stiction and friction—an extremely important goal in magnetic media design.

Figure 3:
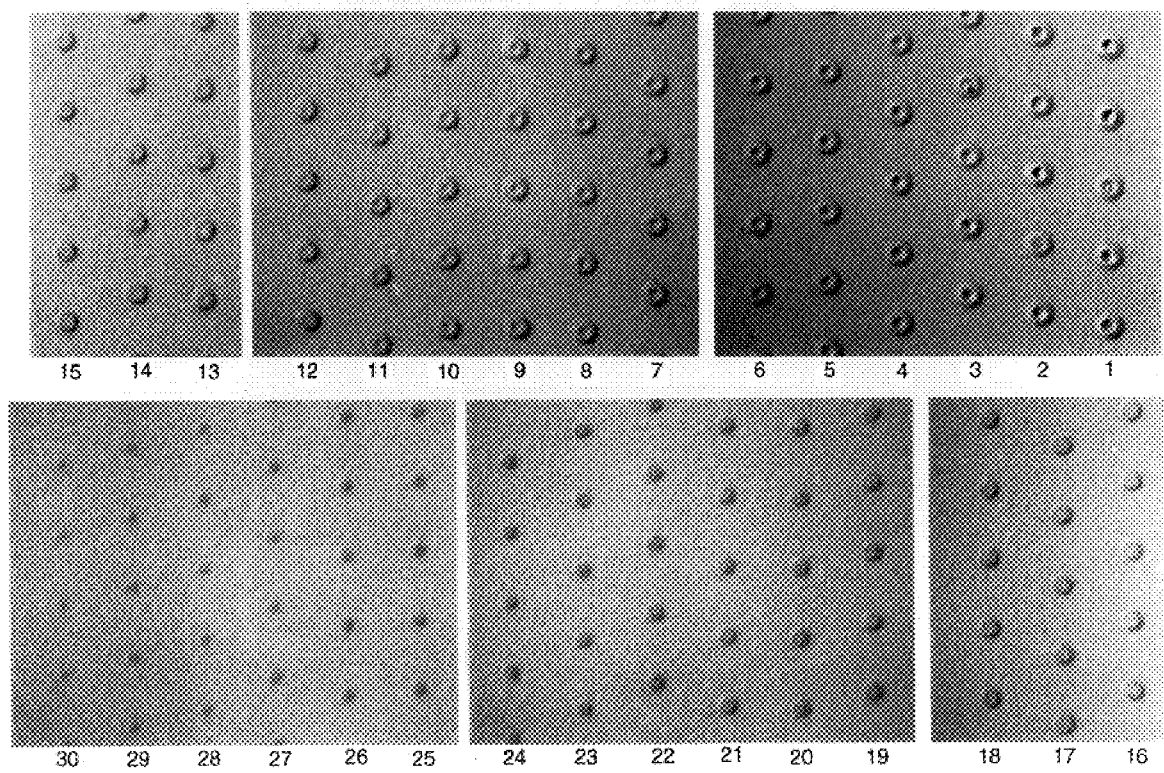
FIG. 3 is a series of are micrographs of laser-textured features formed on an Ohara TS10 glass ceramic substrates.

FIG. 3 is a series of micrographs of laser bumps formed in glass ceramic material with a $CO_2$ laser. The micrographs were made using a differential interference contrast ("DIC") microscope. Each row of bumps is numbered in FIG. 3 (bump numbers 1 to 30) The laser beam focused spot size was 24 μm, the pulse width was 5 μs, and the power used is set forth in Table II below. As pulse energy increases, the bump grows both in width and height. The roughness of the bump decreases as the pulse energy increases. At a high enough energy, the bump develops a central depression which is smooth (an undesirable result).

TABLE II

| Track # | Pulse Energy (μJ) |
|---------|-------------------|
| 1       | 16.02             |
| 2       | 15.62             |
| 3       | 15.32             |
| 4       | 14.94             |
| 5       | 14.59             |
| 6       | 14.27             |
| 7       | 13.58             |
| 8       | 12.95             |
| 9       | 12.57             |
| 10      | 12.25             |
| 11      | 11.62             |
| 12      | 11.33             |
| 13      | 10.98             |
| 14      | 10.70             |
| 15      | 10.41             |
| 16      | 10.06             |
| 17      | 9.78              |
| 18      | 9.47              |
| 19      | 9.21              |
| 20      | 8.96              |
| 21      | 8.68              |
| 22      | 8.39              |
| 23      | 8.14              |
| 24      | 7.88              |
| 25      | 7.60              |
| 26      | 7.31              |
| 27      | 7.12              |
| 28      | 6.84              |
| 29      | 6.58              |
| 30      | 6.33              |

Figure 4A:
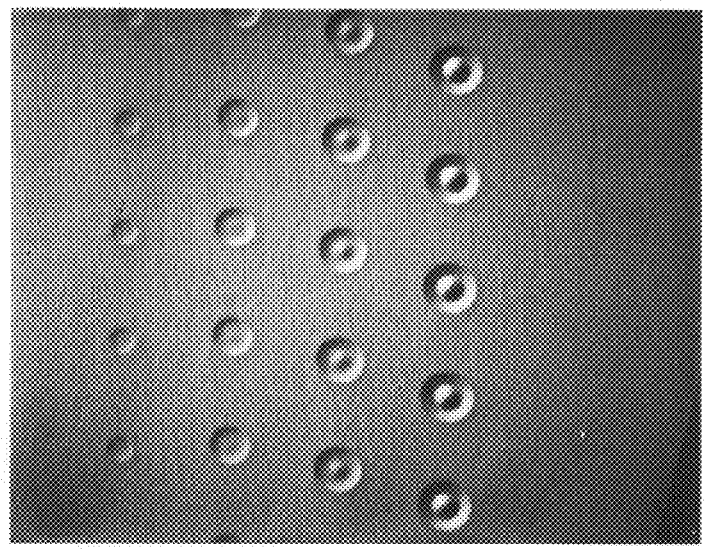
FIGS. 4a and 4b are micrographs cf laser texture features formed on a FOTURAN glass ceramic substrate.
Figure 4B:
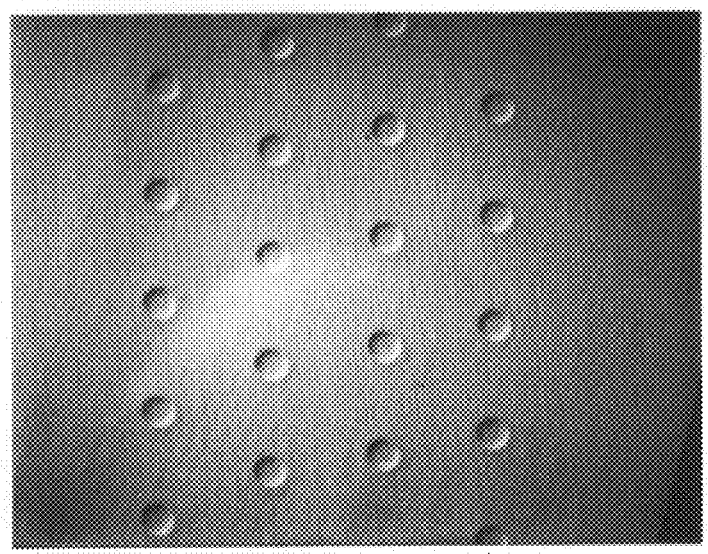

As mentioned above, other glass ceramic materials can be used in our invention. One such material is sold under the trade name FOTURAN available from Schott Glaswerke of Germany, FOTURAN is an alkali-aluminosilicate glass, whose photosensitive characteristics arise from additives of $Ce_2O_3$ and $Ag_2O$ or $Au_2O$ or $Cu_2O$. FOTURAN is described in "Fotosensitive structuring of FOTURAN—The Process", by Schott Corporation of Yonkers, N.Y., incorporated herein by reference. FIGS. 4a and 4b are DIC photomicrographs of laser texture features formed on a FOTURAN substrate in accordance with our invention. Polishing scratch marks can be seen in these photographs extending over the texture bumps. The polishing scratch marks are not removed at the site of the laser texture features. We believe that this confirms that unlike the Teng process, our process does not significantly smooth out the substrate.

Figure 6A:
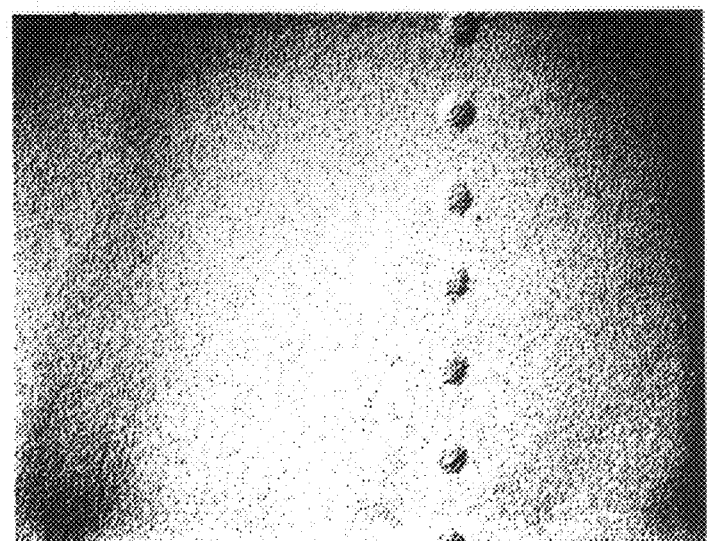
FIG. 6a is a micrograph of laser texture features on a Raychem MOD-AL-100 glass ceramic substrate.
Figure 6B:
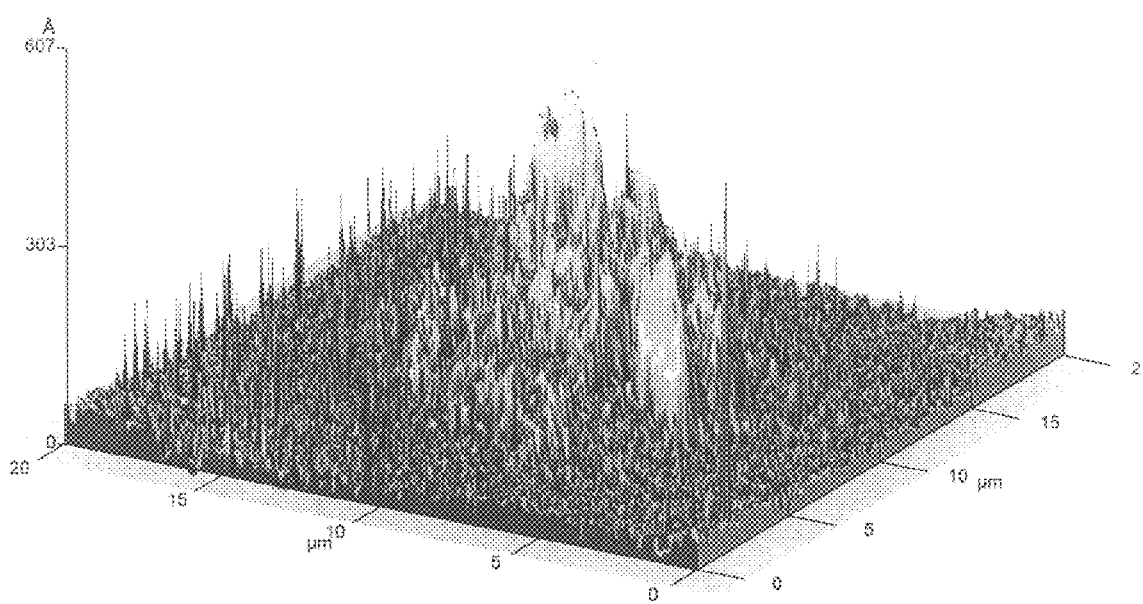
FIG. 6b is an AFM image of laser texture features on a Raychem MOD-AL-100 glass ceramic substrate.

Another glass ceramic material that can be used in our invention is sold under the trade name MOD-AL 100 available from Raychem. FIGS. 6a and 6b are images of the laser texture features formed on the MOD-AL 100 substrate. The laser parameters used were a laser wavelength of 10.6 μm, a focused spot size of 24 μm, an optical pulse length of 1 μs, and an optical pulse energy of 16.3 μJ. Again, unlike Teng's description, our laser texture features are not smooth, but are quite jagged.

INDUSTRIAL APPLICATION

Figure 5:
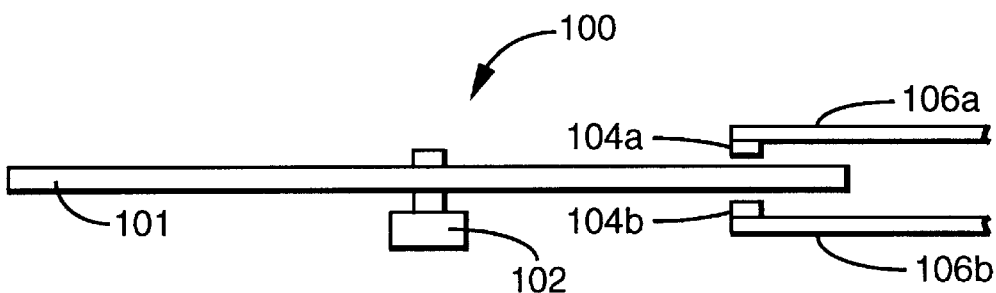
FIG. 5 shows a disk drive incorporating a magnetic disk in accordance with our invention.
Figure 2A:
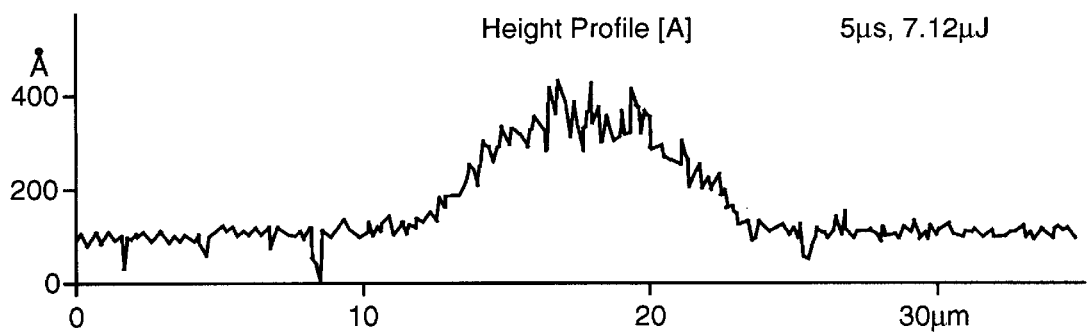
FIGS. 2a to 2d show the roughness profile of laser texture features formed on an Ohara TS10 glass ceramic substrates.
Figure 2B:
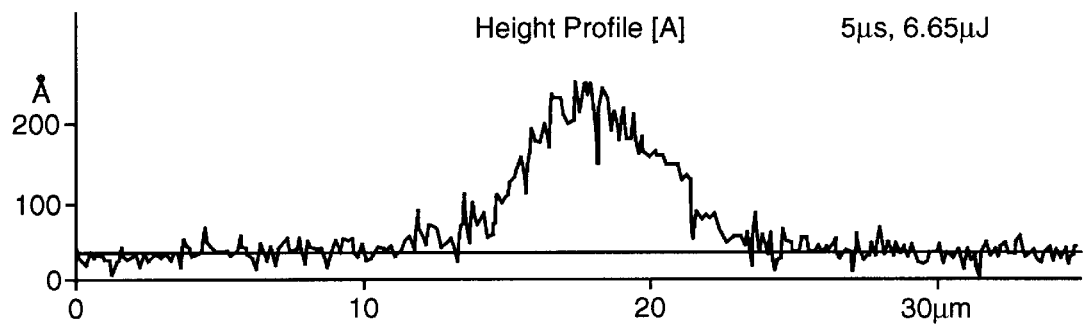
Figure 2C:
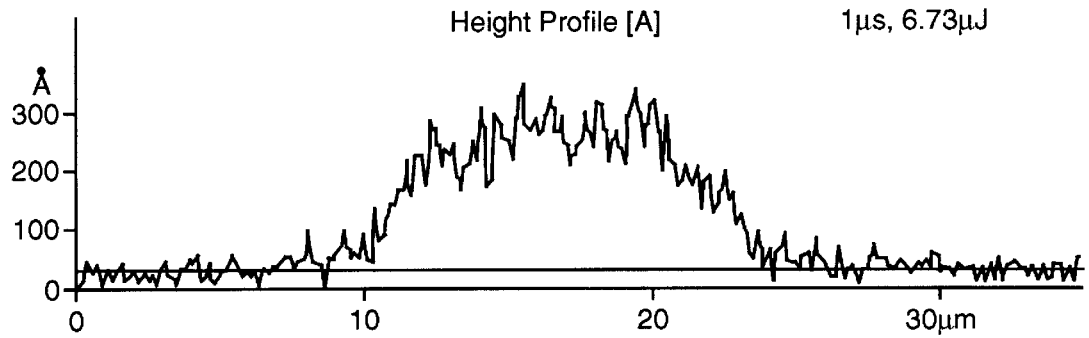
Figure 2D:
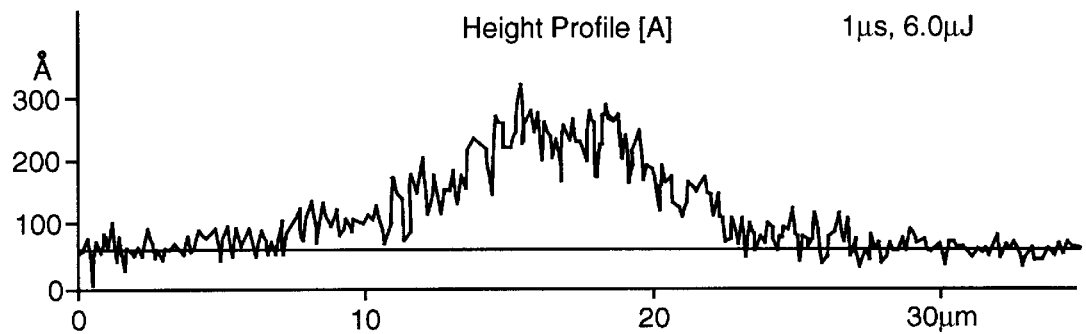

A disk in accordance with our invention is incorporated into a disk drive. FIG. 5 shows a disk drive 100 including a disk 101 constructed in accordance with our invention coupled to a motor 102 for rotating disk 100, e.g. at 5000 to 10,000 rpm.

A pair of read-write heads 104a, 104b, mounted on arms 106a, 106b are held in proximity to disk 101 to read data from and write data thereto. Arms 106a 106b are coupled to an actuator (not shown) for moving heads 104a, 104b to desired positions over disk 101.

The components shown in FIG. 5 are conventional (except for disk 100). Disk drives are discussed in U.S. Pat. No. 4,949,202 (Kim); U.S. Pat. No. 5,025,335 (Stefansky); U.S. Pat. No. 5,027,241 (Hatch) and U.S. Pat. No. 5,025,336 (Morehouse), incorporated herein by reference.

While the invention has been described with respect to specific embodiments, those skilled in the art will recognize that changes can be made in form and detail without departing from the spirit and scope of the invention. For example, the texture formed on the substrate can be confined to a "take-off and landing" zone or the texture can be placed on the entire substrate surface. In addition, various magnetic alloys (e.g. Fe and Co alloys) can be used. Also, other types of underlayers (e.g. Cr, Cr alloys, sputtered NiP or other materials) and other protective overcoats can be used. (Alternative protective overcoats are discussed in U.S. Pat. No. 4,898,774, issued to Yamashita et al., incorporated herein by reference.) These layers can be deposited by sputtering, evaporation or other techniques. Accordingly, all such changes come within our invention.

We claim:

1. A method for manufacturing a magnetic disk comprising the steps of:

texturing a glass ceramic substrate by applying a laser pulse to said substrate such that a portion of said substrate is heated to a temperature higher than the glass transition temperature of the glass phase of said substrate but lower than the melting point of the crystal phase of said substrate, said step of applying a laser pulse resulting in a protrusion extending outwardly from said substrate, small texture features being on and extending from said protrusion, wherein said protrusion has a width between 1 and 30 microns and a height between 1 and 50 nm, said small texture features having widths between 0.05 and 3 microns and peak to valley distances between 1 and 40 nm; and depositing a magnetic layer over said substrate after said step of texturing.

2. Method of claim 1 further comprising the step of applying a series of laser pulses to said substrate, wherein said series of laser pulses result in a series of areas being transformed into a series of positive protrusions, wherein the majority of protrusions have a width between 1 and 30 microns and a height between 1 and 50 nm, and wherein the majority of protrusions include small texture features having widths between 0.05 and 3 microns and peak to valley distances between 1 and 40 nm.

3. Method of claim 1 further comprising the steps of depositing an underlayer, magnetic layer and protective overcoat on said substrate after said step of applying a laser pulse.

4. Method of claim 3 further comprising the step of depositing a lubricant on said protective overcoat.

5. A magnetic disk manufactured by the method of claim 1.

6. A disk drive comprising a disk made by the method of claim 1, said disk drive further comprising means for rotating said disk, a read-write head for reading data from and writing data to said disk, an arm for holding said read-write head in proximity to said disk and an actuator for moving said arm.

7. A method for manufacturing a magnetic disk comprising the steps of:

texturing a glass ceramic substrate by applying a series of laser pulses to said substrate, wherein said series of laser pulses results in a series of areas being transformed into a series of positive protrusions, wherein the majority of protrusions have a width between 1 and 30 microns and a height between 1 and 50 nm, and wherein the majority of protrusions include small texture features on the top surface thereof, said small texture features having widths less than the width of said protrusion, said texture features having widths between 0.05 and 3 microns and peak to valley distances between 1 and 40 nm; and depositing a magnetic layer over said substrate after said step of texturing.

8. Method of claim 7 wherein said peak to valley distances are less than 40 nm and the widths of said small texture features are between 0.05 and 3 microns.

9. Method of claim 7 further comprising the steps of depositing an underlayer, magnetic layer and protective overcoat on said substrate after said step of applying a series of a laser pulses.

10. Method of claim 9 further comprising the step of applying a lubricant on said protective overcoat.

11. A magnetic disk manufactured by the method of claim 7.

12. A disk drive comprising the disk of claim 11, means for rotating said disk, a read-write head for reading data from and writing data to said disk, an arm for holding said read-write head in proximity to said disk, and an actuator for moving said arm.

13. A disk drive comprising a disk made by the method of claim 7, said disk drive further comprising means for rotating said disk, a read-write head for reading data from and writing data to said disk, an arm for holding said read-write head in proximity to said disk and an actuator for moving said arm.

* * * * *